Figure 1:
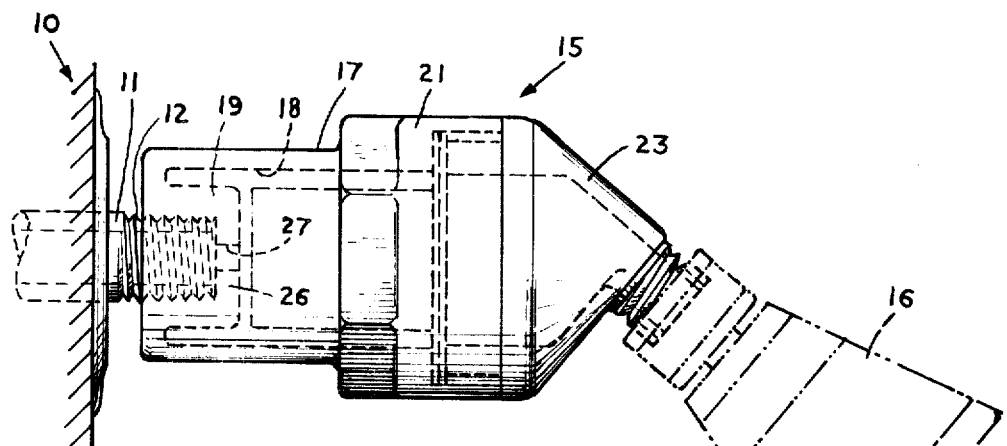

United States Patent
Allison

[11] 3,938,741
[45] Feb. 17, 1976

[54] SHOWER HEADS
[75] Inventor: Lawrence McFarland Allison, Louisville, Ky.
[73] Assignee: Apor Industries, Inc., Chattanooga, Tenn.
[22] Filed: Nov. 18, 1974
[21] Appl. No.: 524,738

[52] U.S. Cl.................. 239/75; 137/468; 236/93 B
[51] Int. Cl.².......................................... B05B 12/10
[58] Field of Search....... 239/75, 67, 456; 236/93 B; 222/54; 137/468

[56] References Cited
UNITED STATES PATENTS

| | | | |
|---|---|---|---|
| 1,303,140 | 5/1919 | Yeiser | 236/93 B |
| 2,010,455 | 8/1935 | Herzbrun et al. | 236/93 B |
| 2,228,626 | 1/1941 | Hetherington | 236/93 B |
| 3,263,926 | 8/1966 | Couffer et al. | 236/93 B |
| 3,856,206 | 12/1974 | Bell et al. | 239/75 |

Primary Examiner—Evon C. Blunk
Assistant Examiner—Michael Mar
Attorney, Agent, or Firm—John J. Hart

[57] ABSTRACT

The shower head comprises a safety device connected between the water supply pipe and the shower nozzle and comprising a hollow housing having an entry end connectible to the water supply pipe, a valve seat provided in the housing in spaced relation to the entry end thereof, temperature responsive power mechanism located in the housing between the entry end thereof and the valve seat, and a valve member connected to the other end of the power mechanism for movement thereby upon an increase in temperature of the water flowing through the housing above a given operating temperature. The power mechanism is constructed and arranged to move the valve member toward the valve seat to close the same when the temperature of the water in the housing reaches the given operating temperature.

4 Claims, 3 Drawing Figures

SHOWER HEADS

THE INVENTION

This invention relates to shower heads and more particularly to a thermostatically controlled shower head which will automatically and completely shut off hot water flow whenever the temperature of the water passing through the device goes above a predetermined temperature.

It is not unusual for the users of showers to become subjected to the effects of water that is too hot either because of the user's improper operation of the shower controls, or because someone else uses cold water at another outlet in the building while the shower is in operation, or for other causes. In order to protect the user of a shower from potential discomfort or injury, the present invention proposes the combination with the conventional shower discharge nozzle, of a safety device which is interposed between the nozzle and the wall provided with the usual shower plumbing.

The invention accordingly has for its primary object the provision of a shower head which embodies a safety device capable of utilizing the temperature of the water flowing therethrough to interrupt the liquid discharge from the shower head whenever such temperature goes above a predetermined degree.

Another object of the invention is to provide in such a shower head, a safety device of the indicated type which will additionally automatically permit further discharge of the water from the shower head when the temperature thereof has been reduced below the predetermined degree.

A further object of the invention is to provide a shower head of the indicated type that is simple and rugged in construction and can be combined readily with ordinary shower fixtures.

Figure 2:
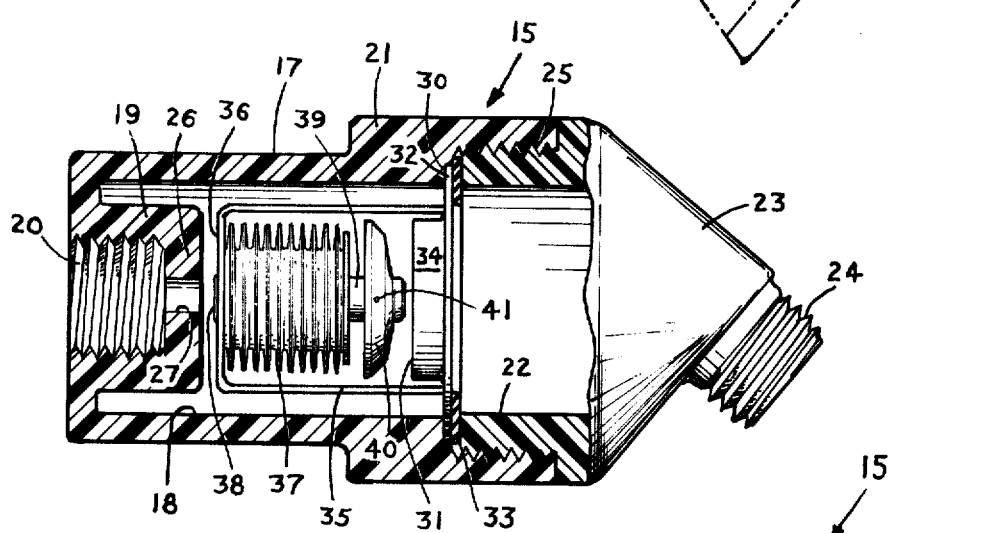
Figure 3:
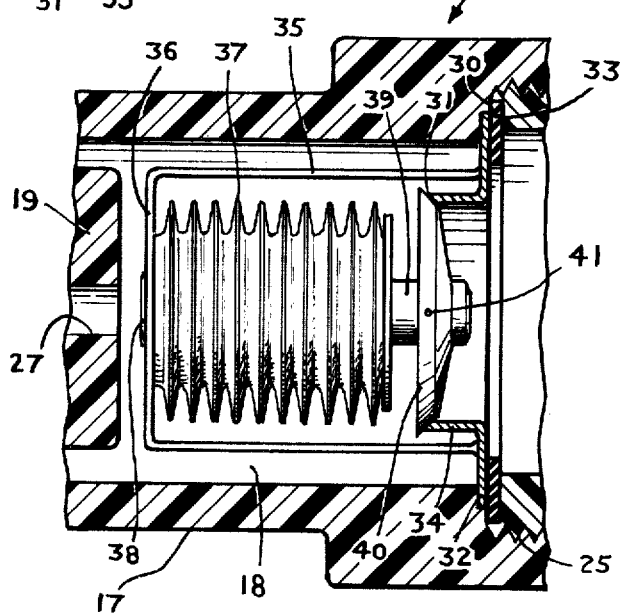

Other objects as well as the advantages of the invention will become apparent from a perusal of the following description, when read in connection with the accompanying drawings, in which FIG. 1 is a side view of a mounted shower head combination embodying the invention, the nozzle of the shower head being shown in dotted outline;

FIG. 2 is a partial vertical sectional view, on an enlarged scale, of the body of the shower head which carries the nozzle and showing the discharge valve thereof in opened position; and FIG. 3 is a vertical sectional view on an enlarged scale of a portion of the shower head body shown in FIG. 2, and showing the discharge valve thereof in closed position.

In the drawings the numeral 10 indicates generally the wall of a shower stall in which is installed the plumbing fixtures for the shower. As is usual such plumbing fixtures include conventional mixing valves (not shown) which control the flow of the mixture of hot and cold water through the terminal pipe section 11 which projects beyond the wall 10 and on the threaded end 12 of which the shower head is mounted in the customary manner.

The shower head of this invention includes a body portion generally designated 15 to which is attached a conventional shower discharge nozzle 16 of any suitable construction. The body 15 is composed of a cylindrically-shaped housing member 17 approximately 1½ inches in diameter and 4 inches in length and constituted of an integral molded piece of a suitable known high impact plastic material capable of handling any pressure used in conventional plumbing throughout the United States, and of withstanding temperatures far exceeding those encountered in the use of such plumbing. A material suitable for the purposes of the invention is the synthetic material known as "Norel Plastic".

The housing 17 is substantially tubular in shape to provide a cylindrical chamber 18 through which the water passes on its way to the nozzle 16. The entry end of the housing 17 is closed by a wall provided with an inwardly projecting integral nipple 19 having a female thread 20 for receiving the threaded end 12 of the terminal pipe section 11. The inner end of the nipple 19 has integrally formed therewith an inturned flange 26 providing a reduced inlet or entry opening 27 between the discharge end of the pipe section 11 and the chamber 18. The entry opening is approximately 3/16 inch in diameter and substantially reduces the pressure of the water supplied through the pipe section 11 so that the water passes through the chamber 18 at a pressure lower than that of the water supplied to the device. The inturned flange 26 also functions as a stop to properly mount the device on the pipe section 11. The other or discharge end 21 of the housing 17 is enlarged and provided with an internal thread 25 for receiving a male thread on the entry end 22 of a coupling member or adapter 23. The other end of the adapter 23 is provided with an externally threaded nipple 24 on which the nozzle is screwed to connect it through the adapter 23 to the discharge end of the housing 17. The adapter 23 is preferably made of a synthetic material similar to that used in the construction of the housing and may have any suitable configuration such as that disclosed in order to hold the nozzle 16 at a given angular position suitable for showering. It will be understood, of course, that the nozzle connecting end of the adapter 23 may be given any other suitable configuration, such as for example one which would enable the nozzle to be moved in relation thereto by the user of the shower.

Secured in position between an internal annular shoulder 30 formed in the discharge end 21 of the housing 17 at the base or inner end of the thread 25, and the inner end of the entry end 22 of the adapter 23 are a flanged ring 32 and a washer 33. The ring 32 is seated in an inner recessed portion of the shoulder 30 and is made of any suitable metal, such as brass. The washer 33 is seated against the outer surface of the ring 32 and the outer portion of the shoulder 30. The washer is made of any suitable sealing material, such as a rubber, and provides a liquid-seal joint between the coupling portions 21 and 22 of the housing 17 and the adapter 23, respectively. The ring 32 is provided at its inner periphery with an inturned integral flange 34 which forms a valve opening 31 having a central axis common with the longitudinal central axis of the chamber 18. Also permanently secured as by solder to diametrically opposed portions of the inner surface of the ring 32 adjacent to the flange 34, are the two ends of a U-shaped bracket or strap 35 which extends longitudinally in the chamber 18 to a point short of the inner end of the nipple 19. Mounted within the strap 35, and connected to the transverse central portion 36 of such strap is a bellows type thermostat 37. The strap portion 36 has a central opening therein and threadedly receives a fastening member 38 attached to the fixed end of the bellows 37. The bellows 37 is of known brass construction and operates on the expansion and contraction of freon gas contained therein to move a rod 38 axially of the bellows. In the practice of the invention, there is selected a bellows of the indicated type having an input pressure of 150 PSI maximum, a bursting pressure of at least 250 PSI and a safety factor temperature of at least 200°F. It will be noted that the bellows 37 is so supported by the strap 35, that the rod 39 thereof under temperature changes will move longitudinally of the chamber 18 along the longitudinal central axis of such chamber which is common with the central axis of the valve opening 31 formed by the flange 34, and toward and away from such valve opening 31. Mounted on the outer end of the rod 39 is a valve member 40 cooperable with the valve opening 31 formed by the inner end of the flange 34 to stop the flow of water from the chamber 18 to and through the adapter 23 to the nozzle 16. The bellows is preferably set in a known manner to cause the valve member 40 to close the valve opening 31 when the water in the chamber 18 reaches a temperature of from 106° – 109°F. As will be noted more clearly in FIG. 3 of the drawings, in the preferred construction, the inner end of the flange 34 forming the valve opening 31 is beveled and the valve seating surface of the valve member 40 is correspondingly beveled to provide a liquid-tight seat of such parts. The valve member 40 is provided with a weep hole 41 to permit the release of pressure and leakage of water so as to dissipate the hot water held in the chamber 18 behind the valve member 40.

It will be understood from the foregoing description of the shower head of this invention, that in the normal operation thereof, the user will operate the conventional mixing valves associated therewith in the usual manner. So long as the temperature of the water remains below the set temperature valve of the bellows 37, say from 106°-109°F., the water will flow uninterruptedly from the pipe 11, through the entry opening 27 where its pressure will be reduced and then at the reduced pressure through the chamber 18 of the housing 17, the valve opening 31 and the adapter 23 and be discharged on the user in the customary manner by the nozzle 16. During such operation of the shower head, the parts of the latter will be in the condition shown in FIG. 2 of the drawings. Should however, the temperature of the water supplied to the chamber 18 be caused for any reason to exceed a predetermined temperature, the temperature responsive bellows 37 will expand, as shown in FIG. 3, and cause the operating rod 39 to move the valve member 40 to closed position thereby immediately stopping the discharge of water from the chamber 18 into the adapter 23 and consequently automatically rendering the shower head inoperative. An important feature of the invention is that the bellows 37 is so mounted in the housing 15 that when it expands due to a rise in temperature in the water flowing through such housing, the rod 39 thereof will move in the direction of flow of the water to the nozzle 16, and the force exerted on the valve member 40 by such flow will cooperate with the bellows 37 to accomplish the closing action of the valve member 40. It will thus be seen that there are no forces tending to impede the closing of valve member 40, but that on the contrary both the action of the temperature of the water on the bellows and the action of the forces of the water on the valve member coact to render the operation of the latter both sensitive and positive and quick to effect an immediate stoppage of any high temperature water that might enter the housing 15. This coaction of the temperature and pressures of the water in the housing is facilitated by providing the valve member with an inner surface configured to take full advantage of the pressure exerted by the flowing water, such as for example, the plane surface illustrated, and having a diameter greater than that of the bellows so that such inner surface projects beyond the bellows into the flow of the water. While the flow of water to the nozzle 16 will be halted with the closing of the valve member 40, the weep hole 41 in such valve member will permit a leakage of the hot water in the chamber 18 and when the temperature of the water in such chamber has been reduced to a safe operating temperature by an incoming quantity of water of a temperature lower than the predetermined setting of the bellows, the latter will operate to withdraw the valve member 40 and premit the water to again flow in the normal manner to the discharge nozzle 16.

While I have illustrated and herein described a preferred embodiment of my invention, it will be apparent to those skilled in the art that changes may be made without departing from the spirit of the invention or the scope of the appended claims.

What is claimed is:

1. A bathing fixture comprising a housing having a water supply inlet communicating with a chamber therein, a valve seat providing an outlet opening for said chamber, a discharge nozzle connected to said housing and in communication with the outlet opening formed by said valve seat, temperature responsive power means located in said chamber, a valve member connected to said power means for movement thereby upon an increase in temperature of the water flowing through said chamber above a given operating temperature, and means in said chamber supporting said power means to enable the latter to move said valve member toward said valve seat to close the opening therethrough when the temperature of the water in said chamber reaches said given operating temperature, one end of said housing being provided with a nipple for connecting a water supply pipe to said housing and forming said water supply inlet, said nipple and said valve seat having a common central axis, and said supporting means supporting said power means between said nipple and said valve seat with one end of said power means fixed in said chamber at a place adjacent to the discharge end of said nipple, said valve member being connected to the other end of said power means and movable along said common central axis toward said valve seat.

2. A bathing fixture as defined in claim 1, including an adapter connected to said housing outwardly of said valve seat and in communication with the outlet opening formed by said valve seat to provide a liquid passage between said valve seat and said discharge nozzle, said valve seat being constituted of a separate annular element secured between said adapter and said housing, said supporting means comprising a bracket secured at its outer end to said valve seat and extending longitudinally in said chamber to a point short of the inner end of said nipple, and said power means being mounted on the inner end of said bracket, whereby said valve seat, bracket and power unit is supported as a removable unit by said housing and adapter.

3. A water supply safety device adapted to be connected between a water supply pipe and a discharge nozzle, said device comprising a hollow housing having an entry end connectible to the water supply pipe to permit the flow of water therethrough, a valve seat provided in said housing in spaced relation to the entry end thereof, temperature responsive power means located in said housing between the entry end thereof and said valve seat, means fixedly securing one end of said power means adjacent to the entry end of said housing, and a valve member connected to the other end of said power means for movement thereby in the direction of flow of the water through said housing upon an increase in temperature of the water flowing through said housing above a given operating temperature, said power means being constructed and arranged to move said valve member toward said valve seat to close the same when the temperature of the water in said housing reaches said given operating temperature, the entry end of said housing comprising a nipple for connecting a water supply pipe to said housing, an inturned flange provided on the inner end of said nipple and defining an entry opening having a diameter less than that in the discharge end of the water supply pipe and such as to reduce the pressure of the water supplied through such entry opening into said hollow housing.

4. A safety device as defined in claim 3, in which said nipple is internally threaded up to said inturned flange, the length of said thread being less than the length of the screw thread provided on the discharge end of the water supply pipe.

* * * * *